(12) United States Patent
Zevallos

(10) Patent No.: US 10,362,177 B2
(45) Date of Patent: Jul. 23, 2019

(54) ENHANCED CONGESTION CONTROL BY MEANS OF SELECTIVE RESTART OF CREDIT CONTROL SESSIONS

(71) Applicant: NOKIA SOLUTIONS AND NETWORKS OY, Espoo (FI)

(72) Inventor: Cesar Augusto Zevallos, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/751,658

(22) PCT Filed: Aug. 11, 2015

(86) PCT No.: PCT/EP2015/068457
§ 371 (c)(1),
(2) Date: Feb. 9, 2018

(87) PCT Pub. No.: WO2017/025135
PCT Pub. Date: Feb. 16, 2017

(65) Prior Publication Data
US 2018/0241886 A1    Aug. 23, 2018

(51) Int. Cl.
*H04M 15/00* (2006.01)
*H04L 12/14* (2006.01)
*H04W 4/24* (2018.01)

(52) U.S. Cl.
CPC .... *H04M 15/8016* (2013.01); *H04L 12/1403* (2013.01); *H04L 12/1482* (2013.01);
(Continued)

(58) Field of Classification Search
CPC .. H04W 4/24; H04L 12/1403; H04L 12/1482; H04L 12/1467; H04M 15/41;
(Continued)

(56) References Cited

U.S. PATENT DOCUMENTS

| 2012/0036186 A1* | 2/2012 | Mariblanca Nieves ..................... H04L 12/14 709/203 |
| 2015/0319313 A1* | 11/2015 | Lifshitz ................. H04W 76/10 455/406 |
| 2017/0142773 A1* | 5/2017 | Nair ...................... H04W 76/18 |

FOREIGN PATENT DOCUMENTS

WO   WO 2013/026623 A1   2/2013
WO   WO 2014/049433 A2   4/2014

OTHER PUBLICATIONS

International Search Report & Written Opinion dated May 3, 2016 corresponding to International Patent Application No. PCT/EP2015/068457.

(Continued)

*Primary Examiner* — Wayne H Cai
(74) *Attorney, Agent, or Firm* — Squire Patton Boggs (US) LLP

(57) ABSTRACT

The present invention provides apparatuses, methods, computer programs, computer program products and computer-readable media regarding enhanced congestion control by means of selective restart of credit control sessions. The present invention comprises storing an identifier of each of a plurality of credit control sessions handled by the charging entity when a failure has occurred at the charging entity and the plurality of credit control sessions has been terminated and a bearer associated with each of the plurality of the credit control session is to be maintained; and sending a message for requesting restart of at least one of the plurality of credit control sessions to a gateway entity handling the plurality of credit control sessions, the message including an identifier of the at least one of the plurality of credit control sessions to be restarted.

19 Claims, 3 Drawing Sheets

(52) U.S. Cl.
CPC ....... *H04M 15/64* (2013.01); *H04M 15/8027* (2013.01); *H04M 15/8228* (2013.01); *H04W 4/24* (2013.01); *H04L 12/1467* (2013.01)

(58) Field of Classification Search
CPC ....... H04M 15/64–66; H04M 15/8016; H04M 15/8027; H04M 15/8228
See application file for complete search history.

(56) References Cited

OTHER PUBLICATIONS

"Digital cellular telecommunications system (Phase 2+); Universal Mobile Telecommunications System (UMTS); LTE; Telecommunication management; Charging management; Diameter charging applications (3GPP TS 32.299 version 12.8.0 Release 12)," Technical Specification, ETSI TS 132 299 V12.8.0 (Apr. 2015), Apr. 2, 2015, XP014248498.

3GPP TS 32.251 V105.0 (May 2011), Technical Specification, 3rd Generation Partnership Project; Technical Specification Group Services and System Aspects; Telecommunication management; Charging management; Packet Switched (PS) domain charging (Release 10), 3GPP, Jun. 17, 2011, pp. 1-82, XP050553231.

3GPP TS 32.240 V12.6.0 (Dec. 2014), Technical Specification, 3rd Generation Partnership Project; Technical Specification Group Services and System Aspects; Telecommunication management; Charging management; Charging architecture and principles (Release 12), Dec. 2014.

P. Calhoun et al., "Diameter Base Protocol," Network Working Group; RFC 3588, Sep. 2003, 147 pages.

H. Hakala et al., "Diameter Credit-Control Application," Network Working Group, RFC 4006, Aug. 2005, 114 pages.

Feb. 12, 2019 Office Action issued in Japanese Patent Application No. 2018-506954.

* cited by examiner

ENHANCED CONGESTION CONTROL BY MEANS OF SELECTIVE RESTART OF CREDIT CONTROL SESSIONS

FIELD OF THE INVENTION

The present invention relates to apparatuses, methods, systems, computer programs, computer program products and computer-readable media regarding enhanced congestion control by means of selective restart of credit control sessions.

ABBREVIATIONS/GLOSSARY

In the description of the present invention, the following expressions will be used as defined in documents [1] to [3].
APN Access Point Name
AVP Attribute Value Pair
CCA Credit Control Answer
CCR-I Credit Control Request—Initial Request
CCR-U Credit Control Request—Update Request
CDR Charging Data Record
DCCA Diameter Credit-Control Application
EPC Evolved Packet Core
eNB Evolved NodeB
IMS IP Multimedia Subsystem
IP Internet Protocol
HPLMN Home PLMN
LTE Long Term Evolution
MME Mobility Management Entity
MSCC Multiple Services Credit-Control
OCS Online Charging System
PCEF Policy and Charging Enforcement Function
PGW Packet Data Network Gateway
PLMN Public Land Mobile Network
PS Packet Switched
RAA Re Authorization Answer
RAR Re Authorization Request
SGW Serving Gateway
VoLTE Voice over LTE
VPLMN Visitor PLMN Charging Data Record (CDR): A formatted collection of information about a chargeable event (e.g. time of call set-up, duration of the call, amount of data transferred, etc) for use in billing and accounting. For each party to be charged for parts of or all charges of a chargeable event a separate CDR is generated, i.e. more than one CDR may be generated for a single chargeable event, e.g. because of its long duration, or because more than one charged party is to be charged.

Online Charging System (OCS): the entity that performs real-time Credit-Control. Its functionality includes transaction handling, rating, online correlation and management of subscriber account balances.

Gy: Online charging reference point between a PCEF and an OCS.

Ro: Online charging reference point between a 3GPP network element (e.g. PGW) and the OCS.

BACKGROUND OF THE INVENTION

The present invention belongs to the field of 3GPP (3$^{rd}$ Generation Partnership Project) LTE's (Long Term Evolution) Evolved Packet Core (EPC) architecture. More specifically, the present invention belongs to the online charging logic implemented in the PGW (Packet Data Network Gateway) with control from OCS. This interface is defined in documents [1] to [3].

During the year 2014, 3GPP studied the congestion control mechanism for several interfaces. For Ro (Gy) interface, the conclusion was to not enhance the diameter application, but in case of congestion in OCS, to send to the PGW a CCA (Credit Control Answer) with Result-Code: DIAMETER_TOO_BUSY (3004).

This type of error is defined as "Protocol Error" (3xxx) in document [4] (Diameter Base Protocol). When this error is received, the credit control session, e.g. a DCCA session, needs to be moved to a secondary OCS, and if the secondary OCS is not available, then the DCCA session is terminated. The bearer is released (Failure Handling Action: Terminate) or remains active for a set time (Failure Handling Action: Continue).

Details on the failure handling actions are defined in document [2], "Annex B (normative): Failure Handling procedure and session failover mechanism description", and in document [5] "Chapter 7: Credit-Control Application State Machine".

If the Failure Handling Action is "Terminate" (options "Terminate" or "Retry and Terminate"), the bearer is terminated and subscriber experiences a bad service from the operator (subscriber is not able to access the service it requested because of a fault in operator's OCS, even though at that moment the PGW and Radio Network were all able to provide the service, however they were forced not to provide the service due to the failure at OCS). Terminating the bearer also generates heavy signaling in PGW, SGW (Serving Gateway), MME (Mobility Management Entity), eNodeB (evolved NodeB), up to the mobile terminal. Once the bearer is deleted, after a moment the mobile terminal will open it again (as the subscriber will most likely try to use again the same service).

If the Failure Handling Action is "Continue", the subscriber does not experience a bad service for a configurable time (optional, operator could decide to make the "Continue" option permanent). When the configurable time is elapsed, the bearer is deleted and there is an impact on the subscriber experience in a similar manner as described in the "Terminate" case.

In the case when the Failure Handling Action is "Continue", the DCCA session is terminated for the remaining life of the bearer. Currently, there are no 3GPP methods that allow restarting the DCCA session. There only exist some non 3GPP methods to restart the DCCA session.

For example, a timer can be configured in the PGW which starts running when the "Continue" action is started. After the timer expires, the PGW will try to start again a DCCA session (send CCR-Init) towards OCS. From OCS point of view, PGW is simply creating a new DCCA session, unrelated with the previous (which was deleted when the "Continue" action started). Charging data (CDRs) generated during the "Continue" action can be billed by postprocessing (if subscriber still has quota).

Further, it can be considered to trigger the "Continue" action only for selected error situations. Currently the failure handling procedure is selected for the bearer, and any failure handling trigger will start the selected Failure Handling action (Continue, Terminate, Retry-and-Terminate). The operator wants to trigger the dangerous "Continue" action only for very few error situations, and to terminate the bearer in most of the situations. This would enable operators to allow that e.g. only "DIAMETER_TOO_BUSY" will trigger the "Continue" action, and any other error will simply "Terminate" the bearer. Although this non-3GPP mechanism is not related with restarting a DCCA session, it can be used together with the previous method to restart the DCCA session only for the configured error situations (and not for every error situation as defined by 3GPP).

However, even if the operator implements any of the above mentioned non 3GPP methods for restarting DCCA sessions in case of Failure Handling Action "Continue", the operator needs to face the following usability problems.

When an OCS fails, a large amount of DCCA sessions are deleted (and bearers moved to "Continue"). The timer for the bearers to restart the DCCA session will all expire within a short period of time, which most likely will trigger OCS to become congested again.

REFERENCES:

[1]: 3GPP TS 32.240
[2]: 3GPP TS 32.251
[3]: 3GPP TS 32.299
[4]: IETF RFC 3588: "Diameter Base Protocol"
[5]: IETF RFC 4006: "Diameter Credit-Control Application"

SUMMARY OF THE INVENTION

It is therefore an object of the present invention to overcome the above mentioned problems and to provide apparatuses, methods, systems, computer programs, computer program products and computer-readable media regarding enhanced congestion control by means of selective restart of credit control sessions.

According to an aspect of the present invention there is provided a method for use in a charging entity, comprising:
  storing an identifier of each of a plurality of credit control sessions handled by the charging entity when a failure has occurred at the charging entity and the plurality of credit control sessions has been terminated and a bearer associated with each of the plurality of the credit control session is to be maintained; and
  sending a message for requesting restart of at least one of the plurality of credit control sessions to a gateway entity handling the plurality of credit control sessions, the message including an identifier of the at least one of the plurality of credit control sessions to be restarted.

According to another aspect of the present invention there is provided a method for use in a charging client, comprising:
  receiving a message indicating that a failure has occurred at a charging entity handling a plurality of credit control sessions, the message indicating that the plurality of credit control sessions has been terminated,
  maintaining a bearer associated with each of the plurality of the credit control sessions,
  receiving a message requesting restart of at least one of the plurality of credit control sessions associated with the bearer from the charging entity handling the plurality of credit control sessions, the message including an identifier of the at least one of the plurality of credit control sessions to be restarted,
  sending a message for requesting credit control for at least one of the plurality of credit control sessions corresponding to the identifier to the charging entity.

According to another aspect of the present invention there is provided an apparatus for use in a charging entity, comprising:
  at least one processor,
  and
  at least one memory for storing instructions to be executed by the processor, wherein
  the at least one memory and the instructions are configured to, with the at least one processor, cause the apparatus at least to perform:
  storing an identifier of each of a plurality of credit control sessions handled by the charging entity when a failure has occurred at the charging entity and the plurality of credit control sessions has been terminated and a bearer associated with each of the plurality of the credit control session is to be maintained; and
  sending a message for requesting restart of at least one of the plurality of credit control sessions to a gateway entity handling the plurality of credit control sessions, the message including an identifier of the at least one of the plurality of credit control sessions to be restarted.

According to another aspect of the present invention there is provided an apparatus for use in a charging client, comprising:
  at least one processor,
  and
  at least one memory for storing instructions to be executed by the processor, wherein
  the at least one memory and the instructions are configured to, with the at least one processor, cause the apparatus at least to perform:
  receiving a message indicating that a failure has occurred at a charging entity handling a plurality of credit control sessions, the message indicating that the plurality of credit control sessions has been terminated,
  maintaining a bearer associated with each of the plurality of the credit control sessions,
  receiving a message requesting restart of at least one of the plurality of credit control sessions associated with the bearer from the charging entity handling the plurality of credit control sessions, the message including an identifier of the at least one of the plurality of credit control sessions to be restarted,
  sending a message for requesting credit control for at least one of the plurality of credit control sessions corresponding to the identifier to the charging entity.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

According to a still further aspect of the present invention there is provided an apparatus comprising:
  means for storing an identifier of each of a plurality of credit control sessions handled by a charging entity when a failure has occurred at the charging entity and the plurality of credit control sessions has been terminated and a bearer associated with each of the plurality of the credit control session is to be maintained; and
  means for sending a message for requesting restart of at least one of the plurality of credit control sessions to a gateway entity handling the plurality of credit control sessions, the message including an identifier of the at least one of the plurality of credit control sessions to be restarted.

According to a still further aspect of the present invention there is provided an apparatus comprising:
- means for receiving a message indicating that a failure has occurred at a charging entity handling a plurality of credit control sessions, the message indicating that the plurality of credit control sessions has been terminated,
- means for maintaining a bearer associated with each of the plurality of the credit control sessions,
- means for receiving a message requesting restart of at least one of the plurality of credit control sessions associated with the bearer from the charging entity handling the plurality of credit control sessions, the message including an identifier of the at least one of the plurality of credit control sessions to be restarted,
- means for sending a message for requesting credit control for at least one of the plurality of credit control sessions corresponding to the identifier to the charging entity.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which.

DETAILED DESCRIPTION

Figure 1:
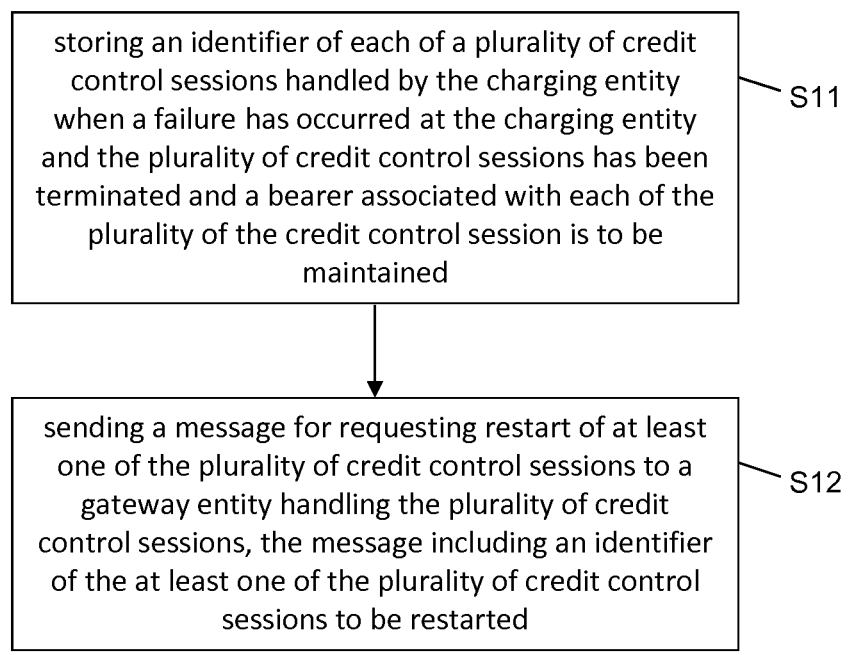
FIG. 1 is a flowchart illustrating an example of a method according to some example versions of the present invention.

In the following, some example versions of the disclosure and embodiments of the present invention are described with reference to the drawings. For illustrating the present invention, the examples and embodiments will be described in connection with a cellular communication network based on a 3GPP based communication system, for example an LTE/LTE-A based system. However, it is to be noted that the present invention is not limited to an application using such types of communication systems or communication networks, but is also applicable in other types of communication systems or communication networks, like for example 2G and 3G communication networks or other wireless communication networks and the like.

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

The basic system architecture of a communication network where examples of embodiments of the invention are applicable may comprise a commonly known architecture of one or more communication systems comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a radio network controller, besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage.

Furthermore, the described network elements and communication devices, such as terminal devices or user devices like UEs, communication network control elements of a cell, like a BS or an eNB, access network elements like APs and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

According to some example versions of the present invention, there is proposed an enhancement to the failure handling action "Continue" by allowing OCS to selectively request the restart of the DCCA sessions that OCS is able to handle. Instead of mass restarting of DCCA sessions (as allowed in non 3GPP methods as described above), it is proposed that OCS will keep a list of the Session-IDs of every DCCA session which OCS moved to "Continue".

When a load at the OCS is lower, i.e. when the load is lower than a predetermined threshold, for example, (or no congestion anymore) or when OCS maintenance work is finished and OCS is alive again, then OCS will start sending RAR (Re-Authorization Request) messages towards PGW, in order to request for the re-authentication for all DCCA quotas for the older Session-IDs.

According to 3GPP, OCS can trigger RAR message including only the Session-ID (identifier of a DCCA-session) if OCS wants to re-authorize every quota or OCS can send a RAR with Session-ID and Rating Group, if OCS wants to re-authorize a specific Rating Group from a subscriber's DCCA session. According to some example versions of the present invention, only the RAR with session-ID is needed.

Currently, according to 3GPP, if OCS sends a RAR messages including only the Session-ID for a DCCA session which was terminated (e.g. Failure Handling action "Continue"), then the PGW will reply to the RAR command with a RAA (Re-Authorization Answer) with Result-Code: DIAMETER_UNKNOWN_SESSION_ID (5002).

If the bearer is still active in the PGW, then it means that the PGW still has the information it needs (it still knows the old Session-ID of the terminated DCCA Session) to know that the RAR is asking for re-authorization of a DCCA session which was terminated at the PGW and that is currently under Failure-Handling-Continue action.

According to some example versions of the present invention, it is then proposed that at reception of such RAR (with a Session-ID which belonged to an active bearer which is under Failure-Handling-Continue action) at the PGW, the PGW will reply to the RAR with a RAA with Result-Code DIAMETER_LIMITED_SUCCESS (2002), and immediately trigger a CCR-U (Credit Control Request—Update Request) (not a CCR-I) towards OCS. Such CCR-U will contain an MSCC (Multiple Services Credit-Control) for every active Rating Group (or combination of Rating Group and Service ID), and will report the consumed traffic from the point the "Continue" action started until the CCR-U was triggered.

It shall be noted that in case the credit control client applies the Failure Handling Continue as a result of the knowledge that the OCS was temporarily congested, then the logic of the present invention could be bound to only the bearers which are under Failure Handling Continue due to OCS overload, while for the bearers which were moved to Failure Handling Continue due to normal OCS credit control, the Selective DCCA Restart could be disabled (credit control client would reply with DIAMETER_UNKNOWN_SESSION_ID (5002) as done currently in the legacy systems).

Because OCS sent the RAR with the Session-ID, it means that OCS still has access to the old DCCA session (otherwise OCS would not know what the Session-ID was in the first place). Then, the OCS can accept the CCA-U, bill for the reported quota and if there is quota left, grant additional quota.

It might be that some OCS vendors might prefer to offer a simpler implementation at OCS side, when OCS only stores the Session-IDs but it does not have anymore access to all previous DCCA-Sessions database. Because of that, the present invention is not limited to force a restart of DCCA session by sending a CCR-U (which requires knowledge at OCS of previous DCCA Session), but some example versions of the present invention also propose local configuration at the PGW to select if the PGW will send a CCR-U or a CCR-I for restarting the DCCA session.

This extra flexibility allows an easier deployment of this invention, because it could then be deployed in 2 steps. In a first step, it can be deployed in systems with a legacy OCS (in which the OCS does not support this invention) by using CCR-I, and in a second step, it can be deployed in systems with compatible OCS (in which OCS does support this invention) by using CCR-U.

According to some example versions of the present invention, sending of CCR-U is the preferred option, as it allows including past charging information. However, sending a CCR-I is also an option, because it would allow simpler implementation at OCS (described previously) and also at the PGW (PGW does not need to store the unsent charging data to OCS, but it can simply send it to CDRs and remove it from its online charging database).

The present invention reuses the existing implementations for RAR/RAA, CCR/CCA messages and its AVPs (Attribute Value Pairs). That is, no new AVPs and no new values of AVPs are required, which makes the feature easier to be approved by 3GPP and by OCS/PGW vendors, as the implementation is only in the logic applied by OCS and by PGW.

According to some example versions of the present invention, operators can more freely use the "Continue" action in case of errors at OCS. This is because the DCCA sessions will eventually be restarted and credit control for the subscribers will be resumed.

Every time when the OCS is able to handle more signaling, it can send a RAR to restart another DCCA session. This can be considered a "slow loop" for restarting DCCA sessions, according to OCS availability, and thus has an advantage with respect to all current methods and proposed methods for failure handling "Continue" with restarting DCCA sessions by local timers at PGW side.

When the PGW sends a CCR which requests quota for all active Rating Groups, a smooth restart of the DCCA session is assured. The PGW already knows which Rating Groups the subscriber is currently using, so it does not need to wait for the DCCA session to be re-established in order to request the needed quotas.

No new information needs to be stored in PGW (as the bearer is still active), therefore there is no capacity impact in the PGW. It is only a software implementation (logic) which will not consume storage resources at the PGW. It will just run extra logic on the already available information in the PGW.

If the PGW has not implemented the proposed invention, or in case the invention is implemented but the bearer was normally released before that RAR arrives, then the PGW will simply reply with DIAMETER_UNKNOWN_SESSION_ID (5002), which is current 3GPP behavior, as mentioned above. Therefore, the example versions of the proposed invention are backward compatible with the current implementation.

The proposed functionality also enhances the current synchronization methods used by OCS to detect ghost session-IDs. In this scenario, a working OCS detects that there are DCCA sessions which should have contacted OCS already but that have not. This is the case where the PGW deletes a DCCA session (and informs OCS), however due to an error (or lost message), the OCS keeps the DCCA session as if it is still active. To remove ghost DCCA sessions, OCS periodically sends RAR messages to request re-authentication for all DCCA sessions which are under suspicion. With the proposed invention, when OCS applies its synchronization method to remove ghost DCCA sessions, all DCCA sessions which were under "Continue" action at the PGW will restart its DCCA session, making the bearers to regain credit control. Then the proposed invention will allow OCS to not only synchronize those ghost DCCA sessions, but also to regain credit control for those. This is an enhancement on current functionality, because those bearers are being terminated under current behavior, generating the extra signaling that releasing bearers demand.

In the following, a more general description of some example version of embodiments of the present invention is made with respect to FIGS. 1 to 3.

FIG. 1 is a flowchart illustrating an example of a method according to example versions of the present invention.

According to example versions of the present invention, the method may be implemented in or may be part of a charging entity, like an online charging system, or the like. The method comprises storing, in a step S11, an identifier of each of a plurality of credit control sessions handled by the charging entity when a failure has occurred at the charging entity and the plurality of credit control sessions has been terminated and a bearer associated with each of the plurality of the credit control session is to be maintained; and sending, in a step S12, a message for requesting restart of at least one of the plurality of credit control sessions to a gateway entity handling the plurality of credit control sessions, the message including an identifier of the at least one of the plurality of credit control sessions to be restarted.

According to some example versions of the present invention, the method further comprises receiving a message for requesting credit control for the at least one of the plurality of credit control sessions corresponding to the identifier from the charging client.

According to some example versions of the present invention, the message for requesting credit control is an update credit control request message and includes information on the consumed traffic for an active rating group used by a subscriber during the failure, and the method further comprises resuming credit control for the subscriber based on the information included in the message.

According to some example versions of the present invention, the method further comprises informing the charging client that the charging entity is temporarily congested.

Figure 2:
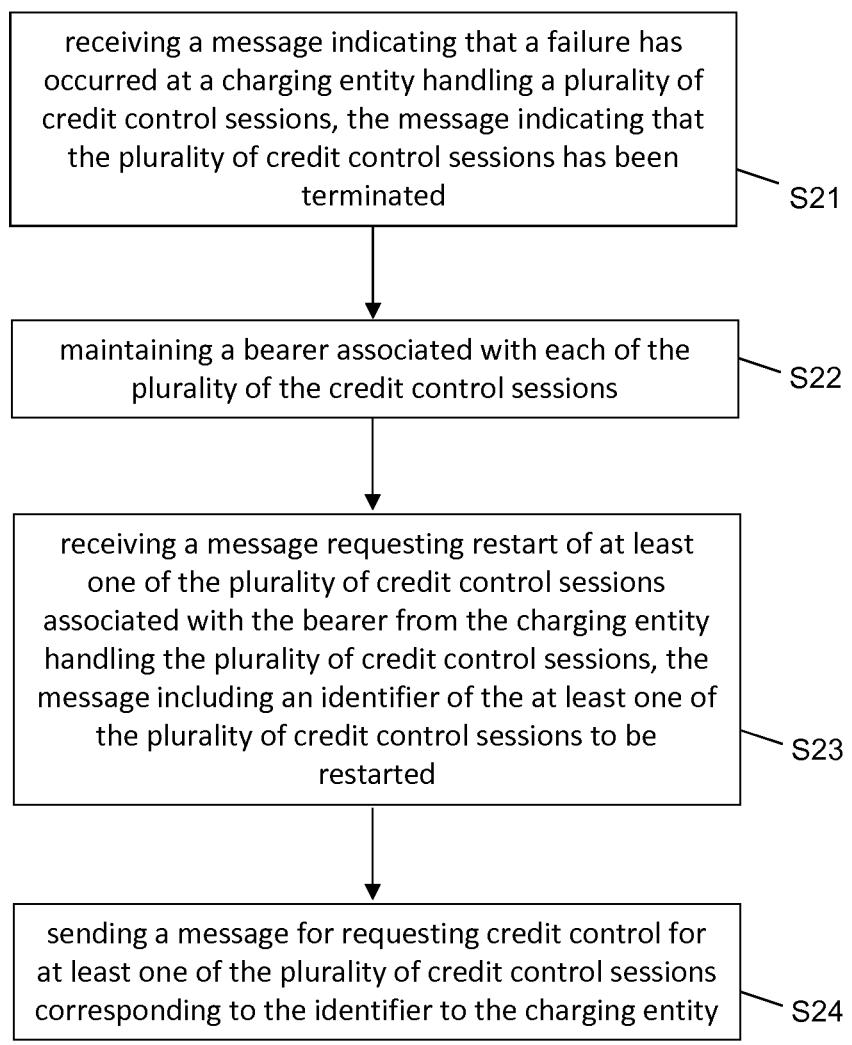
FIG. 2 is a flowchart illustrating another example of a method according to some example versions of the present invention.

FIG. 2 is a flowchart illustrating another example of a method according to example versions of the present invention.

According to example versions of the present invention, the method may be implemented in or may be part of a charging client, like a PGW, or the like. The method comprises receiving, in a step S21, a message indicating that a failure has occurred at a charging entity handling a plurality of credit control sessions, the message indicating that the plurality of credit control sessions has been terminated, maintaining a bearer associated with each of the plurality of the credit control sessions in a step S22, receiving, in a step S23, a message requesting restart of at least one of the plurality of credit control sessions associated with the bearer from the charging entity handling the plurality of credit control sessions, the message including an identifier of the at least one of the plurality of credit control sessions to be restarted, and sending a message for requesting credit control for at least one of the plurality of credit control sessions corresponding to the identifier to the charging entity in a step S24.

According to some example versions of the present invention, the message indicating that a failure has occurred at a charging entity further indicates that the charging entity is temporarily congested.

According to some example versions of the present invention, the message for requesting credit control is an update credit control request message and includes information on the consumed traffic for an active rating group used by a subscriber during the failure.

According to some example versions of the present invention, the message for requesting credit control is an initial credit control request message.

Figure 3:
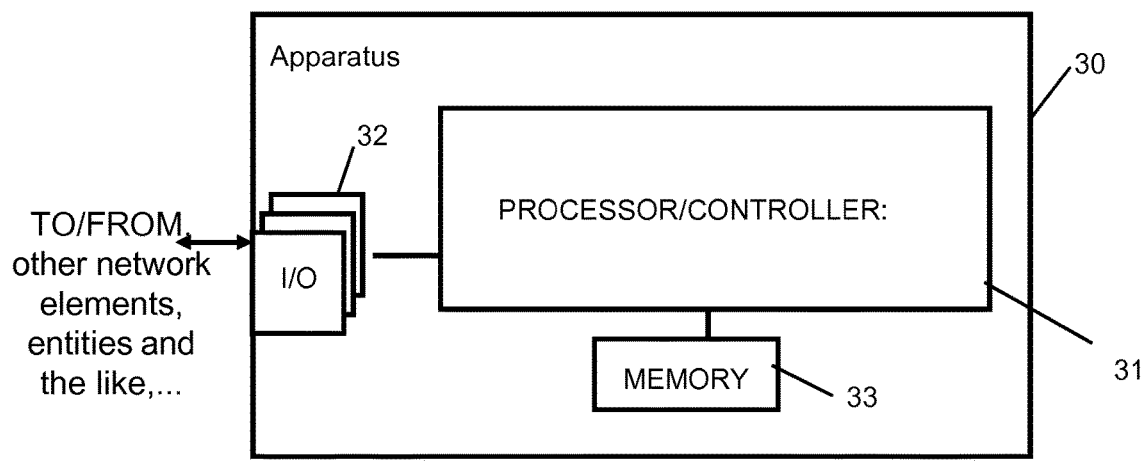
FIG. 3 is a block diagram illustrating an example of an apparatus according to some example versions of the present invention.

FIG. 3 is a block diagram illustrating an example of an apparatus according to some example versions of the present invention.

In FIG. 3, a block circuit diagram illustrating a configuration of an apparatus 30 is shown, which is configured to implement the above described aspects of the invention. It is to be noted that the apparatus 30 shown in FIG. 3 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 30 may comprise a processing function or processor 31, such as a CPU or the like, which executes instructions given by programs or the like. The processor 31 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 32 denotes transceiver or input/output (I/O) units (interfaces) connected to the processor 31. The I/O units 32 may be used for communicating with one or more other network elements, entities, terminals or the like. The I/O units 32 may be a combined unit comprising communication equipment towards several network elements, or may comprise a distributed structure with a plurality of different interfaces for different network elements. The apparatus 30 further comprises at least one memory 33 usable, for example, for storing data and programs to be executed by the processor 31 and/or as a working storage of the processor 31.

The processor 31 is configured to execute processing related to the above described aspects. In particular, the apparatus 30 may be implemented in or may be part of a charging entity, like an online charging system, or the like, and may be configured to perform a method as described in connection with FIG. 1. Thus, the processor 31 is configured to perform storing an identifier of each of a plurality of credit control sessions handled by the charging entity when a failure has occurred at the charging entity and the plurality of credit control sessions has been terminated and a bearer associated with each of the plurality of the credit control session is to be maintained; and sending a message for requesting restart of at least one of the plurality of credit control sessions to a gateway entity handling the plurality of credit control sessions, the message including an identifier of the at least one of the plurality of credit control sessions to be restarted.

According to some example versions of the present invention, the apparatus 30 may be implemented in or may be part of a charging client, like a PGW, or the like, and may be configured to perform a method as described in connection with FIG. 2. Thus, the processor 31 is configured to perform receiving a message indicating that a failure has occurred at a charging entity handling a plurality of credit control sessions, the message indicating that the plurality of credit control sessions has been terminated, maintaining a bearer associated with each of the plurality of the credit control sessions, receiving a message requesting restart of at least one of the plurality of credit control sessions associated with the bearer from the charging entity handling the plurality of credit control sessions, the message including an identifier of the at least one of the plurality of credit control sessions to be restarted, and sending a message for requesting credit control for at least one of the plurality of credit control sessions corresponding to the identifier to the charging entity.

For further details regarding the functions of the apparatus 30, reference is made to the description of the methods according to some example versions of the present invention as described in connection with FIGS. 1 and 2.

Thus, it is noted that the apparatus for use in a charging entity, and the apparatus for use in a charging client, generally have the same structural components, wherein these components are configured to execute the respective functions of the elements, respectively, as set out above.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method for use in a charging entity, comprising:
storing an identifier of each of a plurality of credit control sessions handled by the charging entity when a failure has occurred at the charging entity and the plurality of credit control sessions has been terminated and a bearer associated with each of the plurality of the credit control session is to be maintained; and
sending a message for requesting restart of at least one of the plurality of credit control sessions to a gateway entity handling the plurality of credit control sessions, the message including an identifier of the at least one of the plurality of credit control sessions to be restarted.

2. The method according to claim 1, further comprising:
receiving a message for requesting credit control for the at least one of the plurality of credit control sessions corresponding to the identifier from the charging client.

3. The method according to claim 2, wherein:
the message for requesting credit control is an update credit control request message and includes information on the consumed traffic for an active rating group used by a subscriber during the failure,
the method further comprising
resuming credit control for the subscriber based on the information included in the message.

4. The method according to claim 1, further comprising:
informing the charging client that the charging entity is temporarily congested.

5. A method for use in a charging client, comprising:
receiving a message indicating that a failure has occurred at a charging entity handling a plurality of credit control sessions, the message indicating that the plurality of credit control sessions has been terminated,
maintaining a bearer associated with each of the plurality of the credit control sessions,
receiving a message requesting restart of at least one of the plurality of credit control sessions associated with the bearer from the charging entity handling the plurality of credit control sessions, the message including an identifier of the at least one of the plurality of credit control sessions to be restarted,
sending a message for requesting credit control for at least one of the plurality of credit control sessions corresponding to the identifier to the charging entity.

6. The method according to claim 5, wherein:
the message indicating that a failure has occurred at a charging entity further indicates that the charging entity is temporarily congested.

7. The method according to claim 5, wherein
the message for requesting credit control is an update credit control request message and includes information on the consumed traffic for an active rating group used by a subscriber during the failure.

8. The method according to claim 5, wherein
the message for requesting credit control is an initial credit control request message.

9. An apparatus for use in a charging entity, comprising:
at least one processor;
and
at least one memory for storing instructions to be executed by the processor; wherein
the at least one memory and the instructions are configured to, with the at least one processor, cause the apparatus at least to perform
storing an identifier of each of a plurality of credit control sessions handled by the charging entity when a failure has occurred at the charging entity and the plurality of credit control sessions has been terminated and a bearer associated with each of the plurality of the credit control session is to be maintained; and
sending a message for requesting restart of at least one of the plurality of credit control sessions to a gateway entity handling the plurality of credit control sessions, the message including an identifier of the at least one of the plurality of credit control sessions to be restarted.

10. The apparatus according to claim 9, wherein the at least one memory and the instructions are further configured to, with the at least one processor, cause the apparatus at least to perform:
receiving a message for requesting credit control for the at least one of the plurality of credit control sessions corresponding to the identifier from the charging client.

11. The apparatus according to claim 10, wherein:
the message for requesting credit control is an update credit control request message and includes information on the consumed traffic for an active rating group used by a subscriber during the failure,
wherein the at least one memory and the instructions are further configured to, with the at least one processor, cause the apparatus at least to perform:
resuming credit control for the subscriber based on the information included in the message.

12. The apparatus according to claim 9, wherein the at least one memory and the instructions are further configured to, with the at least one processor, cause the apparatus at least to perform:
informing the charging client that the charging entity is temporarily congested.

13. An apparatus for use in a charging client, comprising:
at least one processor;
and
at least one memory for storing instructions to be executed by the processor; wherein
the at least one memory and the instructions are configured to, with the at least one processor, cause the apparatus at least to perform
receiving a message indicating that a failure has occurred at a charging entity handling a plurality of credit control sessions, the message indicating that the plurality of credit control sessions has been terminated,
maintaining a bearer associated with each of the plurality of the credit control sessions,
receiving a message requesting restart of at least one of the plurality of credit control sessions associated with the bearer from the charging entity handling the plurality of credit control sessions, the message including an identifier of the at least one of the plurality of credit control sessions to be restarted, sending a message for requesting credit control for at least one of the plurality of credit control sessions corresponding to the identifier to the charging entity.

14. The apparatus according to claim 13, wherein:
the message indicating that a failure has occurred at a charging entity further indicates that the charging entity is temporarily congested.

15. The apparatus according to claim 13, wherein
the message for requesting credit control is an update credit control request message and includes information on the consumed traffic for an active rating group used by a subscriber during the failure.

16. The apparatus according to claim 13, wherein
the message for requesting credit control is an initial credit control request message.

17. A computer program product embodied on a non-transitory computer-readable medium, said computer program product including a program for a processing device, comprising software code portions for performing the method of claim 1 when the program is run on the processing device.

18. The computer program product according to claim 17, wherein the computer program product comprises a computer-readable medium on which the software code portions are stored.

19. The computer program product according to claim 17, wherein the program is directly loadable into an internal memory of the processing device.

* * * * *